Nov. 6, 1923.

O. M. JULSON

HITCH

Filed June 23, 1922   2 Sheets-Sheet 1

1,473,563

Oscar M. Julson
INVENTOR

BY Victor J. Evans
ATTORNEY

WITNESS:
L. B. James

Nov. 6, 1923.
O. M. JULSON
HITCH
Filed June 23, 1922    2 Sheets-Sheet 2
1,473,563
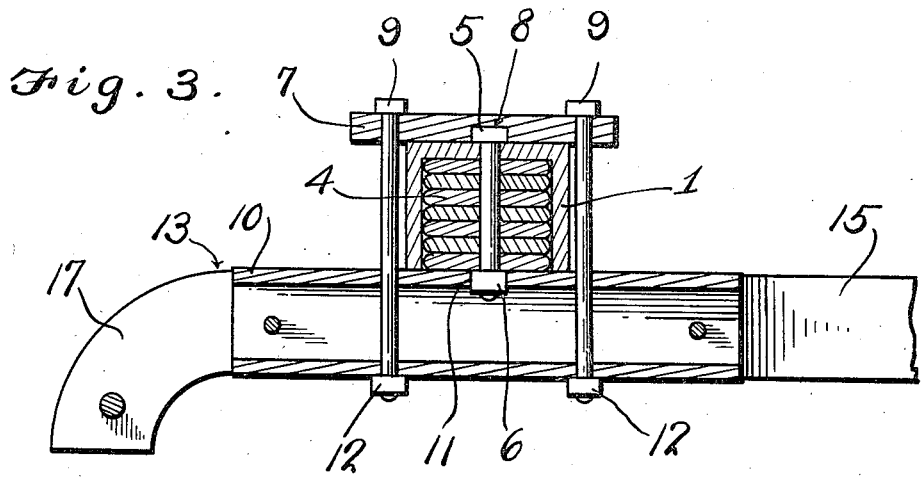
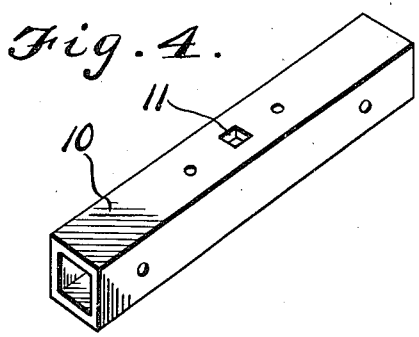
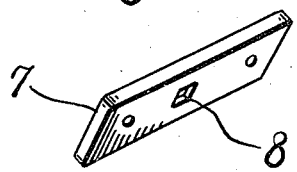
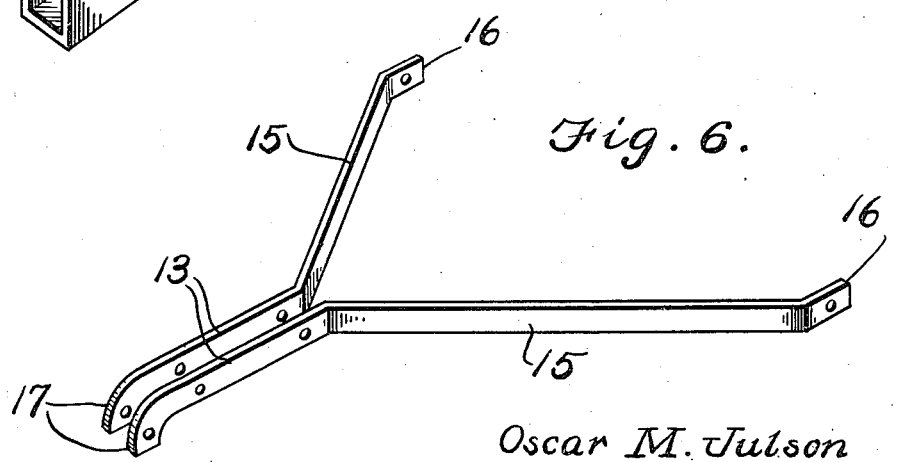
Oscar M. Julson
INVENTOR
BY Victor J. Evans
ATTORNEY
WITNESS: L. B. James Patented Nov. 6, 1923.

1,473,563

UNITED STATES PATENT OFFICE.

OSCAR M. JULSON, OF GROTON, SOUTH DAKOTA.

HITCH.

Application filed June 23, 1922. Serial No. 570,309.

*To all whom it may concern:*

Be it known that I, OSCAR M. JULSON, a citizen of the United States, residing at Groton, in the county of Brown and State of South Dakota, have invented new and useful Improvements in Hitches, of which the following is a specification.

My present invention has reference to a hitch for automobiles whereby a trailer can be attached to the automobile.

The primary object of the invention is to produce a hitch for automobiles which will remain a permanent attachment therefrom, which is of a construction to reinforce the frame and the rear spring of the automobile, and which likewise is of such construction as to not interfere with the arrangement of the tail lamp and the license plates on the automobile.

The foregoing, and other objects which will present themselves as the nature of the invention is better understood, may be accomplished by a construction, combination and operative association of parts, such as is disclosed by the drawings which accompany and which form part of this specification.

In the drawings:—

Figure 3 is an enlarged sectional view of the rear end of the hitch, as seen in Figure 2.

Figure 4 is a perspective view of the casting.

Figure 5 is a similar view of the plate which is arranged over the spring receiving frame member.

Figure 6 is a perspective view of the arm members of the improvement.

Figure 1:
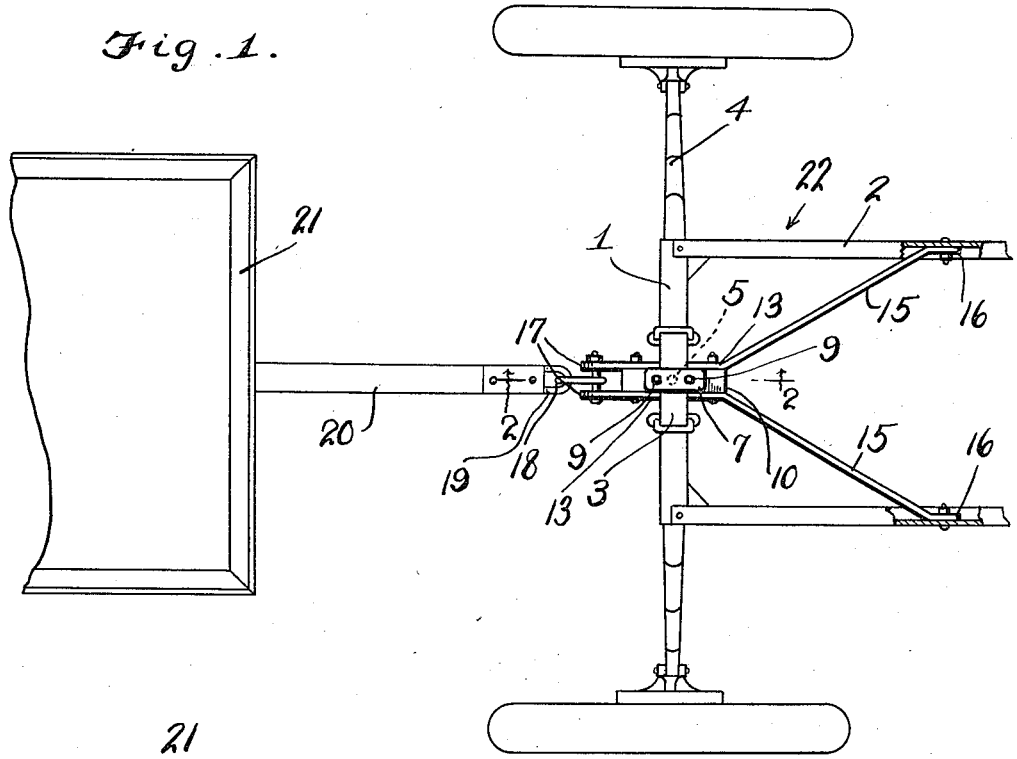
Figure 1 is a plan view of the rear end of an automobile frame to illustrate the application of the improvement, parts being in section.
Figure 2:
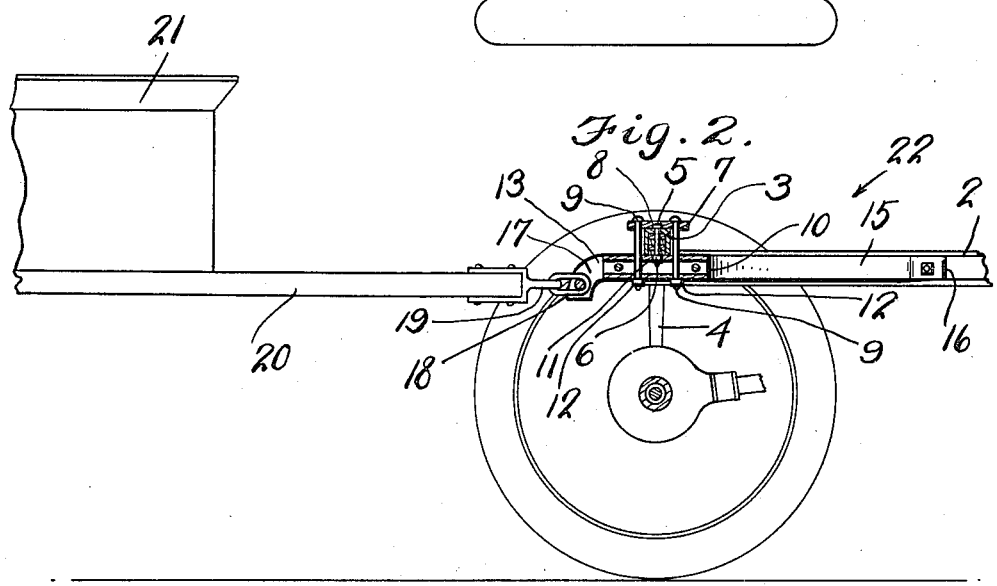
Figure 2 is a sectional view on the line 2—2 of Figure 1.

My improved hitch is designed to be attached to the small class of automobiles known to the trade as the Ford. In such construction of automobiles, the rear member 1 of the frame is in the nature of a channeled iron open to the bottom of the frame, the side members 2 being also in the nature of grooved or channeled irons. The rear member 1 is centrally rounded upwardly to provide a pocket for the central arched portion 3 of the rear spring 4. A bolt 5 passes through the frame member 1 at the center thereof and through the center of the spring, the head of the bolt being disposed in contacting engagement with the upper face of the frame member, and the bolt 6 being in contact with the under face of the central portion of the spring 4.

In carrying out my invention, I arrange over the frame member 1, at the center thereof, a plate 7. This plate is centrally formed with a rectangular opening 8 which receives therein the head of the bolt 5. The plate 7 is of a length greater than the width of the frame member 1, the said plate being provided, adjacent to its ends with openings through which pass bolts 9 respectively, the said bolts being disposed in contacting engagement with the side flanges of the frame member 1.

Arranged below and in contacting engagement with the spring 4 there is the hollow substantially rectangular casting 10 of my improvement. The casting 10 has its upper face provided with a rectangular opening 11 that receives therein the bolt 6, and both its upper and lower faces are provided with aligning openings through which the bolts 9 pass. The bolts 9 are engaged by nuts 12 which contact with the under face of the casting 10. As far as the description has progressed, it will be noted that the bolt 5 and the nut 6 are held from accidental turning and also that the bolts 9, contacting with the sides of the frame and also with the sides of the spring which project below the frame member 1, serve as reinforcements for both the said frame member and the central portion of the spring 4.

The casting 10 has its sides, adjacent to its ends provided with aligning openings, and arranged against the said sides of the casting are the straight outer portions 13 of arms. The arms are in the nature of metallic members, and the said straight portions 13 thereof are provided with openings that align with the openings in the sides of the casting 10, and passing through these openings there are bolts which are engaged by suitable nuts. The inner ends of the arms are arranged at opposite outward angles, as indicated by the numeral 15, the extreme ends of the angle portions being extended in a plane parallel to the portions 13 of the said arms. For distinction, these ends are indicated by the numeral 16, each of the same being provided with an opening. The ends 16 of the arms are received in the channels of the side members 2 of the frame, and I bore holes through the said side members that align with the referred to openings in the ends 16, and through these registering openings I pass bolts that are engaged by nuts. The straight portions 13 of the arms 14 extend a suitable distance beyond the outer end of the hollow casting 10, the said ends being downturned, as at 17, and provided with registering openings. Through these openings there is passed a bolt that is engaged by a nut, the said bolt also passing through one end 18 of a clevis, the opposite or outer end 19 of the said clevis being pivotally secured to the portion 18 thereof. To the clevis 18 there is connected the tongue 20 of a trailer 21.

By reference to the drawings, it will be noted that the clevis at the end of the hitch is disposed only a slight distance beyond the rear of the automobile 22 and that the hitch is so positioned as to not interfere with the arrangement of the tail lamp or the arrangement of the license tag on the automobile. The hitch, as previously inferred, is designed to remain a permanent part of the automobile and also, as previously inferred, the hitch not only serves as a means whereby a trailer can be readily attached to the automobile but materially reinforces the frame work of the automobile.

Having described the invention, I claim:—

The combination with an automobile frame and the rear spring thereof which has its centrally arched portion bolted in the channeled rear cross member of the frame, of a hitch, including plates one arranged over the cross member of the frame and having an opening to receive the bolt of the spring securing element, the other comprising a hollow casting having an opening therein to receive the nut which engages the securing bolt, bolts passing through the frame and casting in contacting engagement with the sides of the cross member of the frame and the sides of the springs, nuts screwed on said bolts and in contact with the under face of the hollow casting, arms having straight parallel outer portions in contacting engagement with the sides of the casting and bolted thereto, said arms having their inner ends extended outwardly in contacting relation with and secured to the side members of the frame, and a clevis comprising swivelly connected members whose inner member is received between the arms and is pivotally secured thereto.

In testimony whereof I affix my signature.

OSCAR M. JULSON.